Aug. 29, 1961     S. ROSEN ET AL     2,998,183
COMPOSITE CONTAINER
Filed Oct. 20, 1958
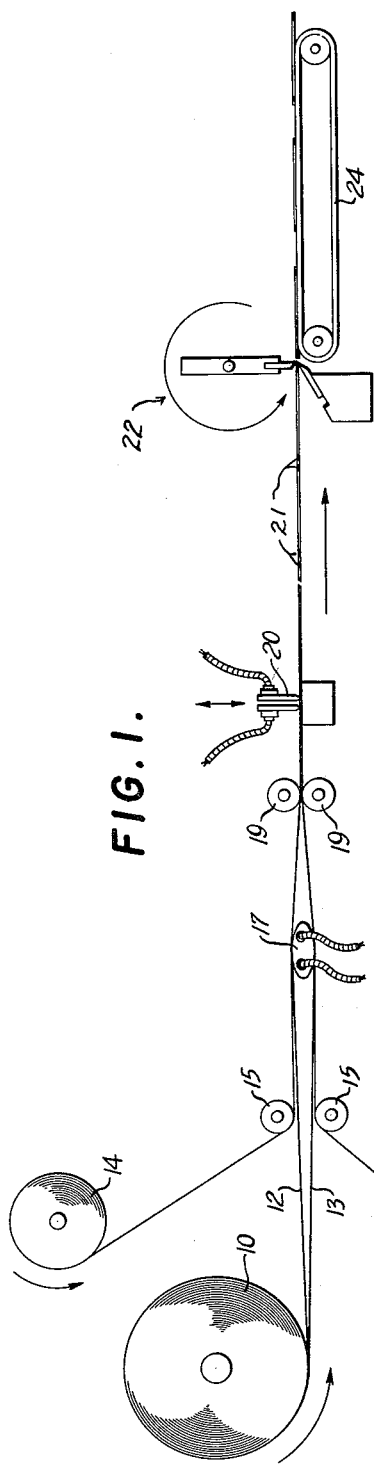
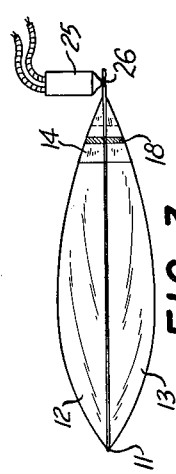
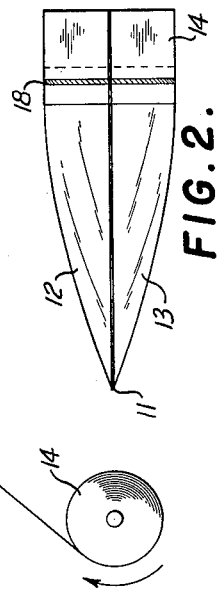
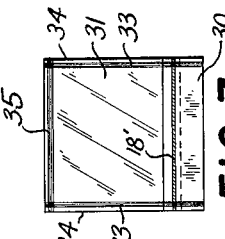
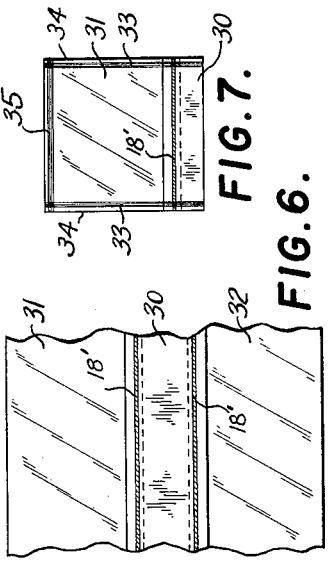
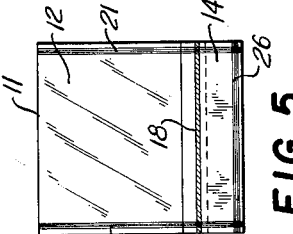
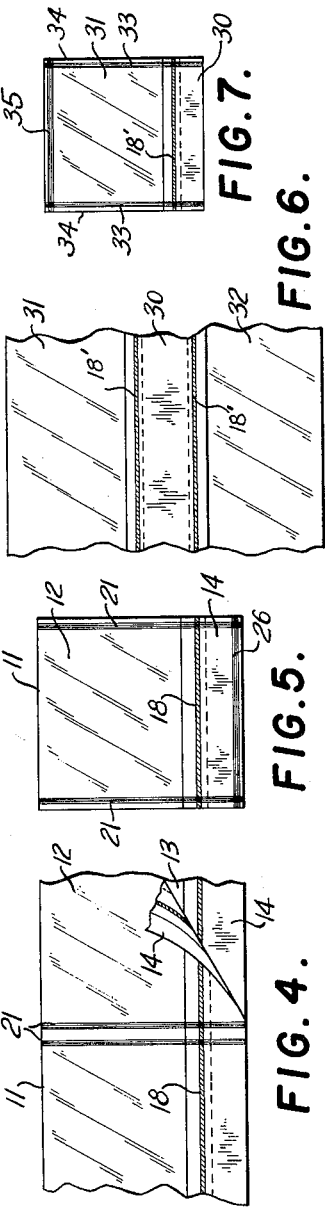
INVENTORS.
SHY ROSEN
HARRY ROSENFELD
BY
Lieber, Lieber & Nilles
Attorneys

United States Patent Office 2,998,183
Patented Aug. 29, 1961

2,998,183
COMPOSITE CONTAINER
Shy Rosen, New York, and Harry Rosenfeld, Long Island City, N.Y., assignors to Milprint, Inc., Milwaukee, Wis., a corporation of Delaware
Filed Oct. 20, 1958, Ser. No. 768,499
4 Claims. (Cl. 229—66)

This invention relates generally to composite containers such as pouches formed from flexible and heat-sealable material.

Pouches of this general character, when formed of thermoplastic material, such as polyethylene or the like, are very difficult to open by tearing. This material is strong and resistant to tearing action, rather it permanently distorts when an attempt is made to tear it, which usually results in a completely ruined pouch. As a result, the conventional pouch of this nature is not only difficult to open, but cannot be refolded and thereby reused for storing the remaining portion of the packaged commodity.

In accordance with the present invention, a flexible thermoplastic pouch is provided having a portion which is also heat-sealable and which can be readily torn to permit opening of the pouch.

The invention further contemplates that this readily tearable portion has a coating which renders it heat-sealable to the main thermoplastic body of the pouch. This heat sealing can be accomplished on standard heat-sealing equipment.

Generally, it is another object of the invention to provide a pouch of the above type which permits the packager to both fill and close the pouch easily and provides uniform advertising space thereon.

Another object of the invention is to provide an improved method for continuously fabricating composite containers of the above type.

These and other objects and advantages will appear later as this disclosure progresses, reference being had to the accompanying drawings, in which;

FIGURE 1 is a schematic diagram showing the method for making composite containers in accordance with the present invention;

FIGURE 2 is a side view of a container made according to the invention and open for filling;

FIGURE 3 shows the container of FIGURE 2 being sealed after it has been filled;

FIGURE 4 is another view of the composite web, after the side welds have been made but before the web has been cut into individual containers;

FIGURE 5 shows a completed container; and

FIGURES 6 and 7 show a modified form of a composite web and pouch respectively, made in accordance with the invention.

Referring in greater detail to FIGURES 1–5 of the drawings, a roll stock 10 of thermoplastic material such as polyethylene is provided which has been pre-folded along the bottom defining line 11 to form the two sides 12 and 13 of the container. A roll of band material 14 is provided on each side of the pre-folded polyethylene web, which band may be of various tearable materials, such as paper, dead-fold foil, or the like. This material is coated, on its side adjacent the pre-folded web, with a heat-sealable material such as, for example, polyethylene.

These "poly"-coated bands 14 are trained around their respective idler roll 15 and then brought into contact with their coresrponding side 12 or 13 of the polyethylene web. An electrically heated ribbon 17 forms a longitudinal seal 18 along the side of the web and to its respective band as they are pressed together in passing over this heated ribbon.

The composite web so formed is then passed through other idler rolls 19 and to a vertically reciprocating duplex sealing bar 20 which reciprocates in timed relationship to movement of the web and periodically contacts the latter to form a double heat seal 21 extending not only across both the sides 12, 13, but also sealing the bands 14 together.

A cut-off knife 22, shown for illustrative purposes as being of the two-blade rotary type, cuts the web between each double seal 21 to thereby form individual containers which are carried away by a suitable conveyor 24.

As clearly shown in FIGURE 5, the ribbon seal 18 is located in the area where the main body of the container overlaps with the band 14 of tearable material.

After the container has been filled with the commodity to be packaged, the bands 14 are heat sealed together by heat-sealing means 25 adjacent their outer ends to form seal 26, thus leaving a considerable area of band material between seals 18 and 26. If desired, a tear line may be printed on or perforated in this area to facilitate opening of the completed pouch.

FIGURES 6 and 7 illustrate a modification of the invention wherein a web 30 of tearable material has a strip 31, 32 of polyethylene or the like sealed along its edges as at 18 to form a composite web. As shown in FIGURE 7, the web 30 is folded along its longitudinal center to form a cover. Transverse heat seals 33 and cuts 34 are then made at spaced locations along the length of the composite web, similar to those formed in the FIGURES 1–5 embodiment. The individual containers so formed are then filled through their open bottom and subsequently a heat seal 35 closes the container to form the completed pouch.

By means of the present invention, a flexible thermoplastic pouch has been provided which can be easily opened by tearing across the top of the entire container to completely open the pouch, or by tearing off only a corner of the easily tearable material to form a pouring spout.

In many cases, the bag may be completely emptied and disposed of without the necessity of resealing the bag to preserve the remaining contents.

However, if only a portion of the contents are to be used at one time, the present invention provides a pouch in which the contents can be reached without distorting, tearing or otherwise damaging the pouch to an extent that it cannot be refolded for reuse. This refolding is facilitated if a dead-fold foil or other foldable material is used for bands 14 or web 30, in which case the opened container can be easily rolled down to again form a tight seal.

Various modes of carrying out the invention are contemplated as being within the scope of the following claims particularly pointing out and distinctly claiming the subject matter which is regarded as the invention.

We claim:
1. A composite container comprising, a main body of flexible thermoplastic material which is resistant to tearing, and a band of comparatively easily tearable material heat-sealed around said body and extending therefrom to form a normally open collar through which a commodity may be inserted, said band having a heat-sealable material thereon whereby it may be sealed together beyond said body to close said container while providing a tearable opening area.

2. A composite container comprising, a main body of flexible thermoplastic material which is resistant to tearing, and a band of comparatively easily tearable foil material having a heat-sealable coating secured by heat-sealing to said body and extending therefrom to form a normally open mouth through which a commodity may be inserted, the extending portion of said band being heat-sealable to itself beyond said body to close said container and provide a tearable opening area beyond said body, 3. A composite container comprising, a main body of tear-resistant thermoplastic material having an open end, and a band of comparatively easily tearable material heat-sealed around said body and extending from said end to form a normally open collar through which a commodity may be inserted, said band having a heat-sealable material thereon whereby it may be sealed together transversely thereacross beyond said body to close said container while providing a tearable opening area between the end of said body and said transverse closure seal.

4. A composite container including a body having two sides of flexible thermoplastic material which are closed along three of their adjacent edges, and a collar of comparatively easily tearable material heat-sealed to said sides and extending therefrom to provide a normally open mouth adapted to be closed by sealing the same beyond said body and thus provide an easily tearable cover area for opening thereof.

References Cited in the file of this patent

UNITED STATES PATENTS

| | | |
|---|---|---|
| 1,217,818 | Peterson | Feb. 27, 1917 |
| 2,245,675 | Hultin | June 17, 1941 |
| 2,265,075 | Knuetter | Dec. 2, 1941 |
| 2,333,587 | Salfisberg | Nov. 2, 1943 |
| 2,643,049 | Bartelt | June 23, 1953 |
| 2,675,957 | Zimmerman | Apr. 20, 1954 |
| 2,699,286 | Geffroy | Jan. 11, 1955 |
| 2,851,212 | Parmer | Sept. 9, 1958 |
| 2,868,435 | Fischer | Jan. 13, 1959 |